United States Patent [19]
Lehr

[11] Patent Number: 5,494,328
[45] Date of Patent: Feb. 27, 1996

[54] AUTOMOBILE SUN SHADE

[76] Inventor: Jaroslaw J. Lehr, 805 Chelham Way, Santa Barbara, Calif. 93108

[21] Appl. No.: 328,359

[22] Filed: Oct. 25, 1994

[51] Int. Cl.$^6$ .................................................. B60J 3/00
[52] U.S. Cl. ........................ 296/97.6; 296/97.7; 296/97.9
[58] Field of Search ................... 296/97.7, 97.6, 296/97.9, 97.1

[56]  References Cited

U.S. PATENT DOCUMENTS

| | | | |
|---|---|---|---|
| 2,163,495 | 6/1939 | Levy | 296/97.6 |
| 2,620,222 | 12/1952 | Beauchamp | 296/97.6 |
| 2,855,242 | 10/1958 | Holmes | 296/97 |
| 4,172,613 | 10/1979 | Furando | 296/97 G |
| 4,261,649 | 4/1981 | Richard | 296/97.7 |
| 4,790,591 | 12/1988 | Miller | 296/97.7 |
| 4,836,599 | 6/1989 | Svensson | 296/97.5 |
| 4,958,879 | 9/1990 | Gillum | 296/97.6 |
| 4,974,896 | 12/1990 | Konishi | 296/97.6 |
| 5,016,937 | 5/1991 | White | 296/97.7 |
| 5,183,094 | 2/1993 | Montasham et al. | 296/97.7 |
| 5,333,927 | 8/1994 | PreJean | 296/97.7 |

FOREIGN PATENT DOCUMENTS

| | | | |
|---|---|---|---|
| 479427 | 12/1951 | Canada | 296/97.6 |
| 2521077 | 8/1983 | France | 296/97.9 |
| 1129014 | 10/1968 | United Kingdom | 296/97.7 |

*Primary Examiner*—David M. Mitchell
*Assistant Examiner*—Gary C. Hoge

[57]  ABSTRACT

A glare shield that fits between the sun visors on an automobile having the top edge secured by clips glued to the windshield, or secured beneath the trim near the roof of the automobile, and having the bottom edge secured by a suction cup.

6 Claims, 1 Drawing Sheet

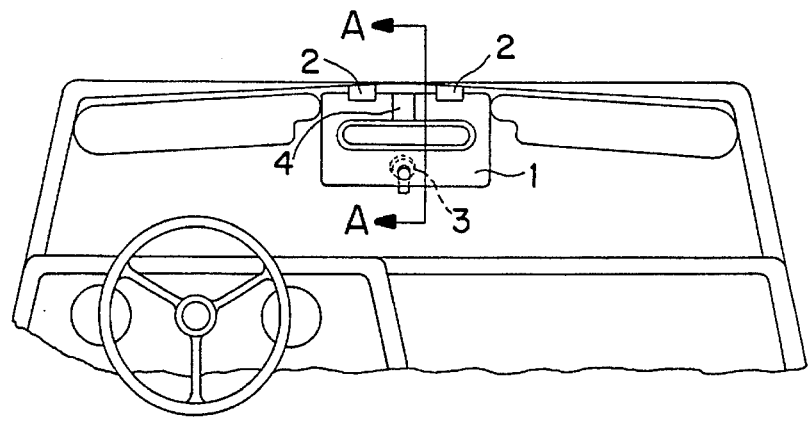
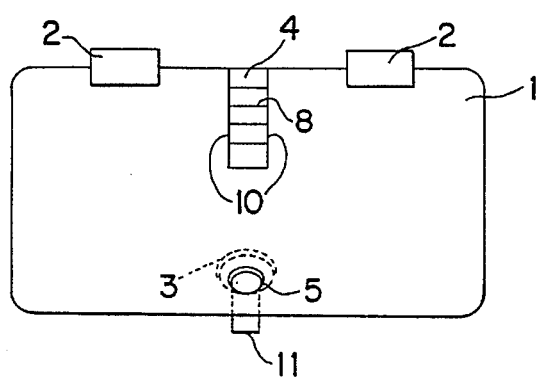
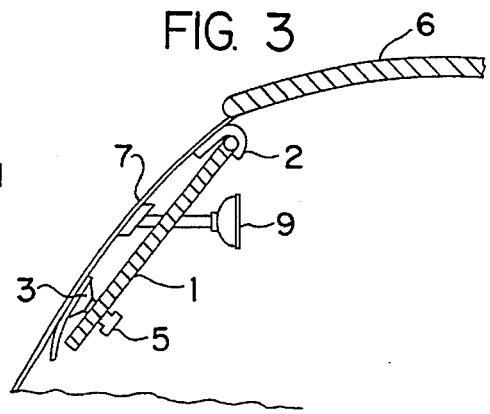
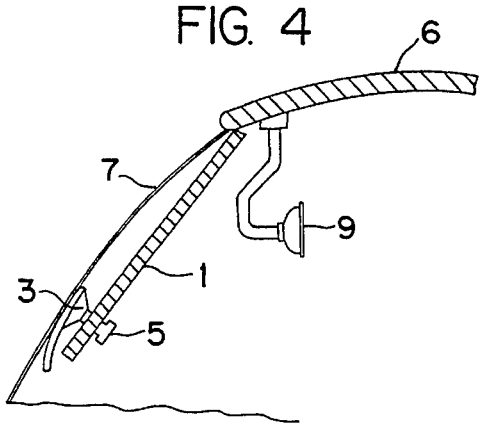
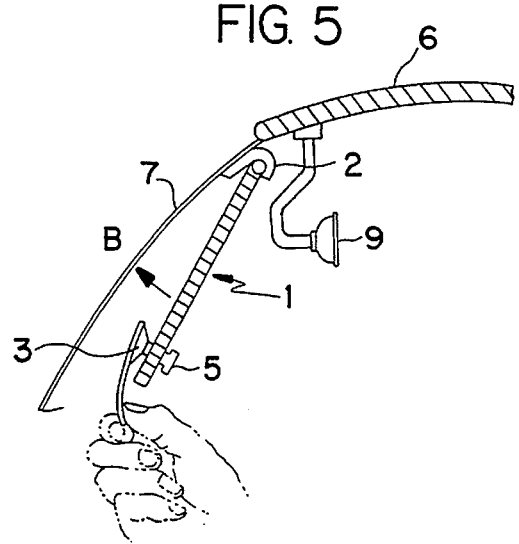

AUTOMOBILE SUN SHADE

BACKGROUND OF THE INVENTION

1. Field of the Invention

This invention relates in general to glare shields and in particular to an improved glare shield that can be easily attached and detached from the inner surface of an automobile windshield.

2. Description of the Prior Art

Most automobiles, now manufactured, have rearview mirrors mounted on a post attached to the inner surface of the automobile windshield. While every automobile has a pair of sun visors, there is an exposed area between the visors, because of the rear window mounting arrangement, that can not be covered with the provided sun visors. Because of this, in the early hours of the morning or in the late afternoon, when the sun is at a low angle, the driver may be exposed to blinding sun glare which will impair visibility.

Various glare shields have been suggested in the prior art which are designed to cover the exposed area between the sun visors. However, either all of the prior art devices use complicated mounting arrangements to mount the glare shield or use devices that are more easily mounted but are subject to moving out of position because they are not securely mounted. As a result drivers tend not to use the glare shields.

SUMMARY OF THE INVENTION

In accordance with the present invention an improved glare shield is provided for attachment to an automobile windshield in the area between the sun visors. The glare shield can be used with rear view mirrors that are mounted directly on the windshield or rear view mirrors that are mounted on some other portion of the automobile interior. The glare shield can be mounted and removed with one hand and, therefore, drivers will be encouraged to use it.

These and other objects and advantages of the present invention will be fully apparent from the following description, when taken in connection with the annexed drawings.

BRIEF DESCRIPTION OF THE DRAWINGS

FIG. 1 is a view of a standard automobile interior with the glare shield in place.

FIG. 2 is a view of the glare shield of the present invention.

FIG. 3 is a cross-sectional view of one embodiment of the glare shield.

FIG. 4 is a cross-sectional view of a second embodiment of the glare shield.

FIG. 5 is a view showing how the glare shield can be mounted with one hand.

DESCRIPTION OF THE PREFERRED EMBODIMENT

FIG. 1 shows the glare shield 1 of the present invention mounted in place between the sun visors in an automobile. The glare shield is more clearly shown in FIG. 2, wherein the shield is shown with the mounting clips 2 engaging the top edge of the shield. A suction cup 3 is mounted on the lower edge of the shield. A protrusion, or other suction breaking device, 5 is attached to the suction cup to aid in removing the suction cup from the automobile windshield.

Also, a finger pull 11 can be used to break the suction of suction cup 3 (see also FIG. 5). The protrusion, or other suction breaking device, can be any shape and can be mounted anywhere on the suction cup as long as it will help release the suction between the cup 3 and the windshield 7. A punch out section 4 of the glare shield is provided at the top edge. This section has vertical portions 10 and horizontal portions 8 that are partially separated from the body of the glare shield 1, and will be used with a rear view mirror that is attached to the windshield of the automobile as shown in FIG. 3. As much of the punch out section as is necessary may be removed by the user so that the glare shield will fit around the rear view mirror.

The portions 8 and 10 are lines of weakened areas or grooves that are scribed or molded into the glare shield 1. By holding a portion of the glare shield, that the user wants to remove, between the index finger and thumb the portion can be bent back and forth until it separates from the glare shield.

The embodiment shown in FIG. 3 uses clips 2 to secure the upper edge of the glare shield 1. These clips are preferably made of clear plastic so they will not obscure the drivers vision. The side of the clips that face the windshield are provided with self adhesive that will permanently secure the clips to the windshield. Since the clips are made of clear plastic they can be left permanently installed on the windshield and they will not obscure the driver's view. The clips 2 will secure the top of the glare shield while the suction cup 3 will secure the bottom of the glare shield so the shield will be securely attached and will not move out of position while the automobile is in motion.

The embodiment of the glare shield shown in FIG. 4 is identical to the embodiment of FIG. 3 except it does not use the clips 2 to secure the top of the glare shield. Instead the interior trim adjacent to the roof is used to secure the top of the glare shield. The driver merely pushes the top of the glare shield under the trim piece adjacent to the roof and then swings the bottom edge of the glare shield toward the windshield until the suction cup is secured to the windshield.

Either the embodiment shown in FIG. 3, or the embodiment shown in FIG. 4 can be used with a rear view mirror attached to the windshield of the automobile, or to a rear view mirror attached to some other portion of the automobile, such as the roof.

The one handed method of installing the glare shield is shown in FIG. 5. The driver holds the bottom edge of the glare shield 1 with one hand and pushes it up into either the clips 2, as shown in FIG. 5, or under the trim adjacent to the roof of the automobile as shown in FIG. 4. With the top edge secured, the driver rotates the shield toward the windshield until the suction cup is secured to the windshield. The glare shield may be removed just as easily. The driver merely grabs the lower edge of the shield with one hand and, using the thumb or one of the other fingers, pushes or pulls against the protrusion 5 while rotating the shield away from the windshield, until the suction is broken. The driver may also use the lower edge of the shield instead of the protrusion 5 to break the suction. Then he merely has to rotate the shield away from the windshield and pull down until the top edge disengages from either the clips 2, or the roof trim 6.

Although the automobile glare shield and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A glare shield for attachment to an automobile windshield adjacent to a rear view mirror support in combination with first and second attachment means for securing said glare shield to said automobile windshield, said glare shield and attachment means comprising:

an elongated panel having a top, bottom, and side edges, said first attachment means comprising a first portion and a second portion, said first portion having means for permanently attaching said first attachment means to said automobile windshield, said first portion being unitarily joined to and spaced from said second portion by a return bend, said first portion being non-movable with respect to said second portion, said first and second portions receiving said top of said elongated panel therebetween, said second attachment means being mounted on said elongated panel adjacent said bottom of said elongated panel, said second attachment means detachably engaging said automobile windshield after said top of said elongated panel is engaged with said first attachment means.

2. The glare shield as claimed in claim 1, wherein said first attachment means is at least a pair of clips that receive said top edge of said glare shield.

3. The glare shield as claimed in claim 1, wherein said glare shield has a portion which can be removed so that said glare shield will fit around a rear view mirror that is attached to said windshield.

4. The glare shield as claimed in claim 1, wherein said second attachment means is a suction cup.

5. The glare shield as claimed in claim 4, wherein said suction cup has a protrusion for breaking the suction between said suction cup and said windshield.

6. A method of mounting a glare shield to an automobile windshield adjacent to a rear view mirror support, said glare shield comprising an elongated panel having a top, bottom, and side edges, and having a detachable securing means mounted adjacent said bottom of said elongated panel, said method comprising:

attaching a J-shaped attachment means comprising a first portion and a second portion joined by a return bend to said automobile windshield, inserting said top of said elongated panel into a space between said first portion and said second portion until said top engages said return bend of said J-shaped attachment means, pivoting said bottom of said elongated panel toward said automobile windshield until said detachable securing means mounted adjacent said bottom of said elongated panel engages said automobile windshield, continuing to pivot said bottom of said elongated panel toward said automobile windshield until said detachable securing means is firmly attached to said automobile windshield, whereby said glare shield may be mounted and unmounted using only one hand.

* * * * *